United States Patent
Starke et al.

(10) Patent No.: US 8,150,391 B2
(45) Date of Patent: Apr. 3, 2012

(54) SYSTEM AND METHOD FOR USING A CELLULAR TELEPHONE IN A MOBILE VEHICLE

(75) Inventors: Henry Starke, Ellerbek (DE); Andrew Muirhead, Norderstedt (DE)

(73) Assignee: Lufthansa Technik AG, Hamburg (DE)

( * ) Notice: Subject to any disclaimer, the term of this patent is extended or adjusted under 35 U.S.C. 154(b) by 475 days.

(21) Appl. No.: 10/576,791

(22) PCT Filed: Oct. 25, 2004

(86) PCT No.: PCT/EP2004/012041
§ 371 (c)(1),
(2), (4) Date: Jan. 3, 2007

(87) PCT Pub. No.: WO2005/041445
PCT Pub. Date: May 6, 2005

(65) Prior Publication Data
US 2007/0206522 A1    Sep. 6, 2007

(30) Foreign Application Priority Data
Oct. 23, 2003  (EP) .................................... 03024455

(51) Int. Cl.
*H04W 4/00* (2009.01)
(52) U.S. Cl. ...................... 455/431; 455/432.1; 455/433; 455/436; 455/437; 455/439; 455/442; 370/316; 370/465; 370/466; 370/467; 370/469
(58) Field of Classification Search .................. 370/316, 370/465, 466, 467, 469; 455/431, 432.1, 455/433, 436, 437, 439, 442
See application file for complete search history.

(56) References Cited

U.S. PATENT DOCUMENTS

| | | | | |
|---|---|---|---|---|
| 5,995,833 | A * | 11/1999 | Zicker | 455/430 |
| 2002/0087992 | A1* | 7/2002 | Bengeult et al. | 725/76 |
| 2002/0152468 | A1* | 10/2002 | Parkman | 725/63 |
| 2003/0055975 | A1* | 3/2003 | Nelson et al. | 709/227 |
| 2003/0081121 | A1* | 5/2003 | Kirmuss | 348/143 |
| 2003/0084130 | A1 | 5/2003 | Annunzio | |
| 2003/0128671 | A1 | 7/2003 | Niesen | |
| 2004/0142658 | A1* | 7/2004 | McKenna et al. | 455/11.1 |

FOREIGN PATENT DOCUMENTS

| | | |
|---|---|---|
| EP | 1 096 699 | 5/2001 |
| EP | 1096699 * | 5/2001 |
| EP | 1096699 A2 * | 5/2001 |
| JP | 11-234766 | 8/1999 |
| JP | 2001-506082 | 5/2001 |
| JP | 2002-261688 | 9/2002 |
| WO | WO 98/26521 | 6/1998 |
| WO | WO 02/15582 A1 | 2/2002 |

OTHER PUBLICATIONS

International Search Report dated Feb. 9, 2005, directed to a counterpart PCT Application No. PCT/EP2004/012041.

* cited by examiner

*Primary Examiner* — Nick Corsaro
*Assistant Examiner* — Amanuel Lebassi
(74) *Attorney, Agent, or Firm* — Morrison & Foerster LLP

(57) ABSTRACT

A system for connecting a cellular phone located in a mobile vehicle such as an aircraft, land vehicle, water craft or space craft to a stationary mobile telephone network includes a mobile radio base station on board the mobile vehicle that converts mobile radio data into IP data and transmits the IP data via an IP connection to a ground station where the IP data are converted back into mobile radio data and provided to a stationary mobile radio network.

18 Claims, 1 Drawing Sheet

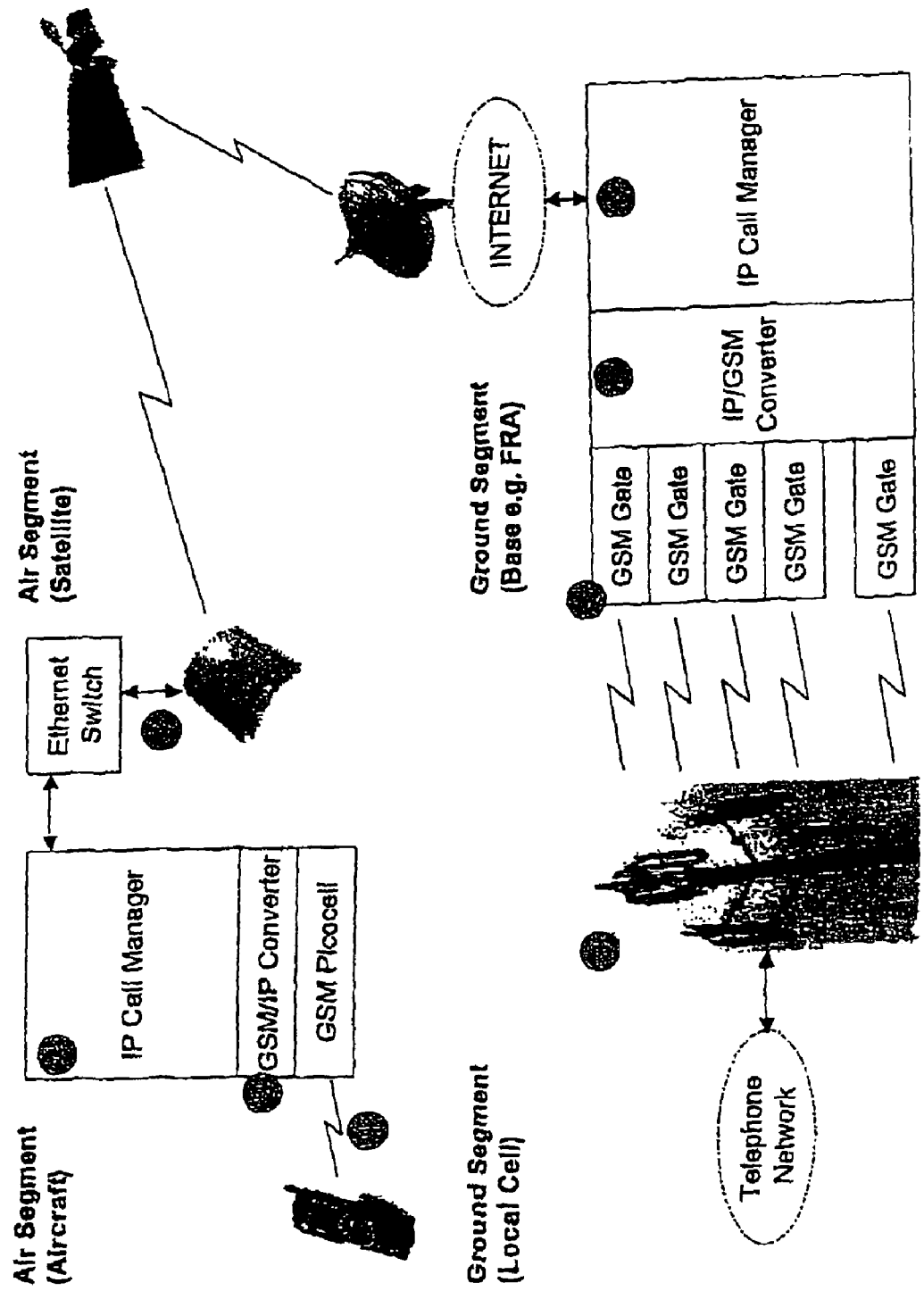

SYSTEM AND METHOD FOR USING A CELLULAR TELEPHONE IN A MOBILE VEHICLE

FIELD OF THE INVENTION

The invention relates to an arrangement and to a method for connecting a cellular phone located in an aircraft, land vehicle, sea- or spacecraft to a stationary mobile radio network.

BACKGROUND OF THE INVENTION

At present, it is not possible to use cellular phones in aircraft. On the one hand, interaction with the electronic on-board systems is feared and on the other hand, no mobile radio networks where a cellular phone could log in are available especially in the case of long-distance flights over unpopulated regions or water.

At present, the aircraft of many airlines are equipped with proprietary communication systems which allow the passengers to conduct voice and/or data communication during the flight. As a rule, these systems are expensive to procure since all seats (or at least rows of seats) must be equipped with corresponding terminals. The connecting costs are also high.

SUMMARY OF THE INVENTION

The invention is based on the object of creating an arrangement and a method of the type initially mentioned which provide for simple communication of passengers of a vehicle with external persons, computers or the like.

This object is achieved by the invention by means of an arrangement which exhibits the following:
on board a vehicle:
a) at least one mobile radio base station,
b) a device for converting the mobile radio data into the IP protocol and conversely,
c) a device for transmitting/receiving IP data to/from a ground station,
at a stationary position:
d) a device for transmitting/receiving IP data to/from a corresponding device of the vehicle,
e) a device for converting the IP data into mobile radio data and conversely,
f) a device for transmitting/receiving the mobile radio data to/from the stationary mobile radio network.

The method according to the invention has the following steps:
aa) logging-in of the cellular phone at a local mobile radio cell which is formed by a mobile radio base station arranged on board the vehicle;
bb) converting the mobile radio data into the IP protocol and conversely;
cc) transmitting/receiving the IP data to/from a ground station;
ee) converting the IP data into mobile radio data and conversely;
ff) transmitting/receiving the mobile radio data to/from the stationary mobile radio network.

Firstly, some terms used in the invention will be explained. The invention can be used for vehicles of all types. In particular, it can be used in air- or sea craft which also stay out of range of stationary mobile radio networks. It can also be used for land vehicles such as, for example, railroad vehicles which travel through regions that are sparsely populated and therefore poorly covered by the mobile radio networks, and/or in which problems occur due to Faraday shielding of the interior of the vehicle. Spacecraft are vehicles which move outside the earth's atmosphere.

Stationary mobile radio networks are the usual land-based mobile radio networks in which a large number of stationary base stations forms mobile radio cells. They can be GSM, UMTS or mobile radio networks according to other conventional standards. They are preferably digital mobile radio networks in which the mobile radio data are transmitted in digital form.

According to the invention, one (or possibly more) mobile radio base stations are arranged in the vehicle. This forms a local mobile radio cell in the interior of the vehicle where cellular phones of the vehicle passengers can log in. The capacity of the base station, i.e. the number of cellular phones which can be logged in at a maximum is adapted to the expected number of vehicle passengers telephoning or transmitting data at the same time. Since the mobile radio base station with its associated antenna is arranged in the immediate vicinity of the passengers and their cellular phones, for example in aircraft, the cellular phones can transmit with very low power so that interaction with the remaining on-board electronics is minimized. If necessary, the remaining on-board electronics can be additionally shielded.

According to the invention, the mobile radio data received by the base station are converted into the IP protocol. The IP protocol is the data protocol of the Internet known to the expert.

These IP data are then transmitted to a ground station by a corresponding device. It can be a connection to a ground station which is switched via, for example, satellites. A particular advantage lies in the fact that radio connections for transmitting IP data already exist in vehicles or are being installed, respectively. These IP connections are used, on the one hand, for the communication of the on-board systems with, for example, monitoring devices on the ground and, on the other hand, provide on-board Internet access to the passengers of an aircraft. A corresponding system for establishing an IP connection between aircraft and ground is offered, for example, by the Boeing company under the name Connexion.

The invention can therefore utilize this IP data connection, which exists in any case or is to be installed for other reasons, between aircraft and ground station for also inexpensively transmitting mobile radio data in the IP format.

In a ground station, the IP data are converted again into mobile radio data (for example GSM or UMTS data). To "filter" the corresponding data out of all the IP data, IP call managers known in the prior art and to the expert can be used which are already being used for Internet IP telephony.

The reconverted mobile radio data are then fed into the stationary mobile radio network by a corresponding device of the ground station. For this purpose, there can be either a line connection with the operator of the mobile radio network or corresponding mobile radio stations can also simply be used which, as it were, simulate the cellular phone located in the vehicle for the mobile radio network. Corresponding so-called mobile radio gateways are commercially available. For the GSM network, there are GSM gateways which can establish connections with local stationary mobile radio networks on a selectable number of channels.

The invention allows the passenger in a vehicle to telephone on board in such a manner as if he were located on the ground in the area of the corresponding mobile radio network. He only incurs the mobile radio connecting costs which would also arise on the ground. If the ground station is arranged in the land region of the home network of the vehicle passenger, he can telephone at the low costs incurred with such a telephone call in the home network. In addition, there can be costs for the IP connection which, as a rule, are charged by the airlines as single flat-rate charge for the use of the IP connection, independently of the purpose for which this is done (mobile telephony, use of the Internet access provided on board or the like). According to the invention, a number of ground stations can be provided in the area of the mobile radio networks of various countries. Since, as a rule, passengers from different countries are on board an aircraft, every passenger can thus log in at his home network or the most cost-effective mobile radio network in each case via a corresponding gateway and the connection according to the invention.

The transmitting/receiving station on the ground for the IP data, on the one hand, and the devices for converting the IP data into mobile radio data and mobile radio gateways, on the other hand, can be spatially separated from one another and connected to one another, for example, via the Internet. A single transmitting/receiving station on the ground for IP data can therefore also be connected to spatially separated devices, located, for example, in the area of different stationary mobile radio networks, for converting into mobile radio data and mobile radio gateways.

In the vehicle, a mobile radio pico cell is preferably formed. This is a very small cell and the base station accordingly only requires very low transmitting power. If necessary, a number of mobile radio pico cells can be formed in larger vehicles, for example large aircraft or ships.

The connection between the on-board mobile radio base station and the on-board transmitting/receiving station for IP data can be established via the intranet of the vehicle. Since, as a rule, an intranet and an IP data transmitting/receiving station exist or are being retrofitted in any case in aircraft, retrofitting the system according to the invention on board thus only requires the mobile radio base station and the device for converting the mobile radio data into the IP protocol and conversely.

BRIEF DESCRIPTION OF THE DRAWING

In the text which follows, the invention will be explained with reference to the drawing which shows an arrangement according to the invention diagrammatically.

DETAILED DESCRIPTION OF THE INVENTION

On board an aircraft, a GSM base station 1 is arranged which forms a GSM pico cell. The base station 1 is connected via the on-board intranet to a GSM/IP converter 2 which converts the GSM data into IP data and conversely. An IP call manager 3 feeds the IP telephony data into the intranet or ethernet of the aircraft and takes the corresponding received IP telephony data from the network, respectively. The connection to a ground station is established via a satellite via an on-board antenna indicated at 4. The transmitting/receiving station on the ground is connected via the Internet to an IP call manager 5 which, as it were, filters the corresponding IP data out of the Internet and converts them back into GSM data via an IP/GSM converter 6. The IP/GSM converter 6 is connected to GSM gateways 7 which establish the connection to the stationary mobile radio network 8. The sequence described is correspondingly reversed for GSM data which are sent from the stationary mobile radio network 8 to a cellular phone in the aircraft.

The invention claimed is:

1. A system for connecting a cellular telephone located in a mobile vehicle to a stationary mobile radio network, comprising:

at a stationary position, (a) a device for transmitting and receiving IP data to and from a corresponding device of the mobile vehicle, (b) a device for converting the IP data into mobile radio data and conversely, and (c) a device for transmitting and receiving the mobile radio data to and from the stationary mobile radio network; and on board the mobile vehicle, (d) a device for transmitting and receiving IP data to and from a ground station, (e) at least one mobile radio base station, configured to generate at least one local mobile radio pico cell, wherein the local mobile radio pico cell does not depend on a position of the vehicle relative to a ground based stationary mobile radio network, and (f) a device for converting the mobile radio data into the IP data and conversely and for transmitting and receiving the mobile radio data to and from the radio base station, wherein the mobile vehicle is out of range of the stationary mobile radio network, and wherein the mobile radio data is at least one of (i) GSM (Global System for Mobile communications), (ii) UMTS (Universal Mobile Telecommunications System) data and (iii) digital mobile radio data converted from analog speech data.

2. The system of claim 1, wherein the mobile radio base station forms a mobile radio pico cell on board the vehicle.

3. The system of claim 1 or 2, wherein the connection between the device (b) and the device (c) is established via the intranet of the vehicle.

4. The system of claim 1 or 2, wherein the device (b) comprises an IP call manager.

5. The system of claim 1 or 2, wherein the device (c) is configured for transmitting or receiving via one or more switching stations.

6. The system of claim 5, wherein the switching stations comprise satellites.

7. The system of claim 1 or 2, wherein the device (d) is configured for transmitting or receiving via one or more switching stations.

8. The system of claim 7, wherein the switching stations comprise satellites.

9. The system of claim 1 or 2, wherein the connection between the device (d) and the device (e) is established via the Internet.

10. The system of claim 7, wherein the connection between the device (d) and the device (e) is established via the Internet.

11. The system of claim 1 or 2, wherein the device (e) comprises an IP call manager.

12. The system of claim 1 or 2, wherein the device (f) transmits or receives the mobile radio data wirelessly or wire-connected to or from the stationary mobile radio network.

13. The system of claim 1 or 2, comprising a plurality of devices (e) and (f) which are arranged spatially spaced apart in areas of different stationary mobile radio networks.

14. The system of claim 1 or 2, wherein the mobile radio base station forms a GSM pico cell onboard the vehicle.

15. The system of claim 1 or 2, wherein the mobile radio data is either (i) GSM (Groupe Spécial Mobile or "Global System for Mobile communications") or (ii) UMTS (Universal Mobile Telecommunications System) data.

16. A method for connecting a cellular phone located in a mobile vehicle to a stationary mobile radio network, comprising:
(a) logging-in the cellular phone at a local mobile radio cell which is formed by a mobile radio base station arranged on board the vehicle;
(b) converting the mobile radio data into IP data and conversely;
(c) transmitting or receiving the IP data to or from a ground station;
(e) converting the IP data into mobile radio data and conversely; and
(f) transmitting or receiving the mobile radio data to or from the stationary mobile radio network,
wherein the local mobile radio cell does not depend on a position of the vehicle relative to a ground based stationary mobile radio network,
wherein the mobile vehicle is out of range of the stationary mobile radio network, and
wherein the mobile radio data is at least one of (i) GSM (Global System for Mobile communications), (ii) UMTS (Universal Mobile Telecommunications System) data and (iii) digital mobile radio data converted from analog speech data.

17. The method of claim 16, wherein the local mobile radio cell is a GSM pico cell onboard the vehicle.

18. The method of claim 16, wherein the mobile radio data is either (i) GSM (Groupe Spécial Mobile or "Global System for Mobile communications") or (ii) UMTS (Universal Mobile Telecommunications System) data.

* * * * *